(12) United States Patent
Mu (10) Patent No.: US 10,271,013 B2
(45) Date of Patent: Apr. 23, 2019

(54) DISPLAY CONTROL METHOD AND APPARATUS

(71) Applicant: TENCENT TECHNOLOGY (SHENZHEN) COMPANY LIMITED, Shenzhen (CN)

(72) Inventor: Weicheng Mu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/833,816

(22) Filed: Dec. 6, 2017

(65) Prior Publication Data

US 2018/0098028 A1 Apr. 5, 2018

Related U.S. Application Data

(63) Continuation of application No. PCT/CN2016/085473, filed on Jun. 12, 2016.

(30) Foreign Application Priority Data

Sep. 8, 2015 (CN) .......................... 2015 1 0567557

(51) Int. Cl.
*H04N 7/14* (2006.01)
*G06F 3/0484* (2013.01)
(Continued)

(52) U.S. Cl.
CPC ........... *H04N 7/147* (2013.01); *G06F 3/0488* (2013.01); *G06F 3/04842* (2013.01);
(Continued)

(58) Field of Classification Search
CPC ... G06F 3/04842; G06F 3/0488; G06Q 30/00; H04N 21/2187; H04N 21/2743; H04N 21/4784; H04N 21/4788; H04N 7/147
(Continued)

(56) References Cited

U.S. PATENT DOCUMENTS 8,423,892 B1 * 4/2013 Marsland ................ H04L 67/38
446/175
9,247,201 B2 * 1/2016 Li ........................... A63F 13/12
(Continued)

FOREIGN PATENT DOCUMENTS

CN 103634681 A 3/2014
CN 103945161 A 7/2014
(Continued)

OTHER PUBLICATIONS

The World Intellectual Property Organization (WIPO) International Search Report for PCT/CN2016/085473 dated Sep. 19, 2016 6 Pages (including translation).
(Continued)

*Primary Examiner* — Khai N. Nguyen
(74) *Attorney, Agent, or Firm* — Anova Law Group, PLLC (57) ABSTRACT

The present disclosure provides a display control method and apparatus. The method may include: establishing, by a first terminal, a video connection with a second terminal; obtaining, by the first terminal, a target identifier of a virtual article identified by a sender to be sent to the second terminal; obtaining, by the first terminal, operation information of an operation of the sender performed on the first terminal associated with the virtual article; encapsulating, by the first terminal, the target identifier and the operation information into electronic resource transmission information; and sending, by the first terminal, the electronic resource transmission information to the second terminal to trigger the second terminal to display, in a display manner corresponding to the operation information, a target virtual article identified by the target identifier.

18 Claims, 7 Drawing Sheets

(51) Int. Cl.
  *G06F 3/0488* (2013.01)
  *G06Q 30/00* (2012.01)
  *H04N 21/2187* (2011.01)
  *H04N 21/2743* (2011.01)
  *H04N 21/4784* (2011.01)
  *H04N 21/4788* (2011.01)

(52) U.S. Cl.
  CPC ......... *G06Q 30/00* (2013.01); *H04N 21/2187* (2013.01); *H04N 21/2743* (2013.01); *H04N 21/4784* (2013.01); *H04N 21/4788* (2013.01)

(58) Field of Classification Search
  USPC .............................. 348/14.07, 14.08, 14.12
  See application file for complete search history.

(56) References Cited

U.S. PATENT DOCUMENTS

| | | | | |
|---|---|---|---|---|
| 9,354,839 | B2* | 5/2016 | Iwamoto | A63F 13/00 |
| 9,520,002 | B1* | 12/2016 | Gavriliuc | G06T 19/006 |
| 9,665,985 | B2* | 5/2017 | Mullins | G06T 19/006 |
| 2010/0322111 | A1* | 12/2010 | Li | A63F 13/12 |
| | | | | 370/260 |
| 2012/0059787 | A1 | 3/2012 | Brown et al. | |
| 2012/0327117 | A1* | 12/2012 | Weller | G06T 19/006 |
| | | | | 345/633 |
| 2013/0174213 | A1* | 7/2013 | Liu | G02B 27/017 |
| | | | | 726/1 |
| 2013/0278633 | A1* | 10/2013 | Ahn | G06T 19/006 |
| | | | | 345/633 |
| 2015/0193982 | A1* | 7/2015 | Mihelich | H04W 4/026 |
| | | | | 345/633 |
| 2018/0098028 | A1* | 4/2018 | Mu | G06F 3/04842 |

FOREIGN PATENT DOCUMENTS

| | | |
|---|---|---|
| CN | 104104703 A | 10/2014 |
| CN | 104184731 A | 12/2014 |
| CN | 104243463 A | 12/2014 |
| CN | 104469064 A | 3/2015 |
| CN | 104615421 A | 5/2015 |
| CN | 104780093 A | 7/2015 |

OTHER PUBLICATIONS

The State Intellectual Property Office of the People's Republic of China (SIPO) Office Action 1 for 201510567557.8 dated Dec. 28, 2018 10 Pages (including translation).

* cited by examiner

DISPLAY CONTROL METHOD AND APPARATUS

RELATED APPLICATION

This application is a continuation application of PCT Patent Application No. PCT/CN2016/085473, filed on Jun. 12, 2016, which claims priority to Chinese Patent Application No. 201510567557.8, entitled "DISPLAY CONTROL METHOD AND APPARATUS" and filed on Sep. 8, 2015, the entire contents of all of which are incorporated herein by reference.

FIELD OF THE TECHNOLOGY

This application relates to the field of network technologies, and specifically, to a display control method and apparatus.

BACKGROUND OF THE DISCLOSURE

With development of streaming media technologies, a video chat between users may be implemented by means of transmission of streaming media. When a user performs video chat, video data captured by a terminal is continuously transmitted to another user or multiple users in a form of streaming media. In a video chat process, a user A may send virtual articles to a peer user B once or multiple consecutive times by means of an operation, and a system performs recording. For example, particular data (such as gold coins, diamonds, or points) and the like of the user A are deducted and redeemed for a specified quantity of particular virtual articles. The peer user B obtains corresponding virtual articles and corresponding presentation such as flowers or lollipops.

In the existing technology, the user A needs to first select a type of virtual article, and then sends the virtual articles to the peer user B after selecting a quantity of the virtual articles, or directly sends the virtual article to the peer user B, and the system performs recording. However, for a same type of virtual articles, after a quantity is selected, a display manner of a receiver terminal of the peer user B is fixed, for example, a manner in which a virtual article flies upward. Consequently, the display manners for transmission of virtual articles cannot be diversified. In addition, the user A needs to continue operating a terminal to complete a sending process after sending a virtual article. Moreover, the user can complete the operation only by means of tapping, reducing the participation degree of the user and user experience.

SUMMARY

Embodiments of this application provide a display control method and apparatus. A target virtual article may be displayed in a display manner corresponding to operation information of a user. Display manners are diversified, and user experience is improved.

In some embodiments, a display control method is provided, which may include: establishing, by a first terminal, a video connection with a second terminal; obtaining, by the first terminal, a target identifier of a virtual article identified by a sender to be sent to the second terminal; obtaining, by the first terminal, operation information of an operation of the sender performed on the first terminal associated with the virtual article; encapsulating, by the first terminal, the target identifier and the operation information into electronic resource transmission information; and sending, by the first terminal, the electronic resource transmission information to the second terminal to trigger the second terminal to display, in a display manner corresponding to the operation information, a target virtual article identified by the target identifier.

In some embodiments, a display control apparatus is provided, which may be applied to a first terminal, and include: a memory; and a processor coupled to the memory. The processor of the first terminal is configured for: establishing a video connection with a second terminal; obtaining a target identifier of a virtual article identified by a sender to be sent to the second terminal; obtaining operation information of an operation of the sender performed on the first terminal associated with the virtual article; encapsulating the target identifier and the operation information into electronic resource transmission information; and sending the electronic resource transmission information to the second terminal to trigger the second terminal to display, in a display manner corresponding to the operation information, a target virtual article identified by the target identifier.

In some embodiments, a non-transitory computer-readable medium is provided. The medium contains computer-executable program for, when being executed by a processor, implementing a display control method, the method including: establishing, by a first terminal, a video connection with a second terminal; obtaining, by the first terminal, a target identifier of a virtual article identified by a sender to be sent to the second terminal; obtaining, by the first terminal, operation information of an operation of the sender performed on the first terminal associated with the virtual article; encapsulating, by the first terminal, the target identifier and the operation information into electronic resource transmission information; and sending, by the first terminal, the electronic resource transmission information to the second terminal to trigger the second terminal to display, in a display manner corresponding to the operation information, a target virtual article identified by the target identifier.

BRIEF DESCRIPTION OF THE DRAWINGS

To illustrate the technical solutions in the embodiments of this application or in the existing technology more clearly, the accompanying drawings required for describing the embodiments or the existing technology are briefly described below. Apparently, the accompanying drawings in the following description show merely some embodiments of this application, and a person of ordinary skill in the art may still derive other drawings from these accompanying drawings without creative efforts.

DESCRIPTION OF EMBODIMENTS

The technical solutions in the embodiments of this application are clearly described in the following with reference to the accompanying drawings. Apparently, the embodiments to be described are merely a part rather than all of the embodiments of this application. All other embodiments obtained by a person of ordinary skill in the art based on the embodiments of this application without creative efforts shall fall within the protection scope of this application.

A display control method provided in an embodiment of this application is described in detail below with reference to FIG. 1 to FIG. 7. In the present disclosure, a sending terminal may be referred to as a first terminal; and a receiving terminal may be referred to as a second terminal. Further, a user operating the sending terminal may be referred to as a first user or a sender; and a user operating the receiving terminal may be referred to as a second user or a receiver.

Figure 1:
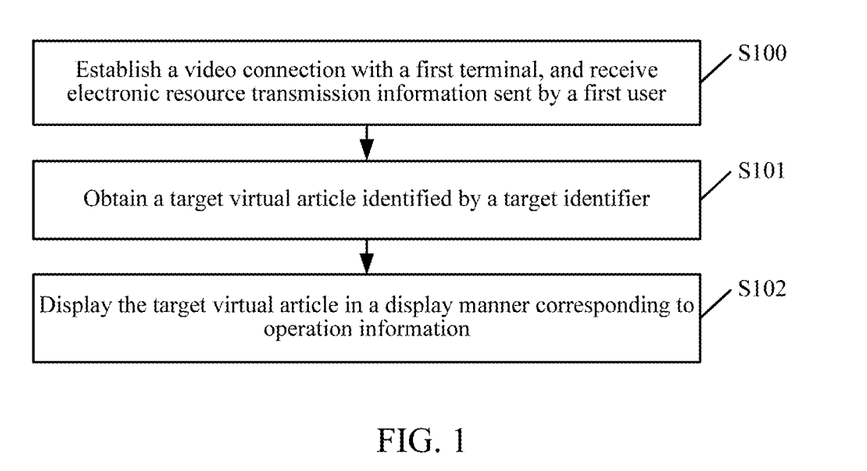
FIG. 1 is a flowchart of a display control method according to an embodiment of this application.

Referring to FIG. 1, FIG. 1 is a flowchart of a display control method according to an embodiment of this application. The display control method in some embodiments is applied to a second terminal. The method may include step S100 to step S102.

S100: Establish a video connection with a first terminal of a first user, and receive electronic resource transmission information sent by the first user, the electronic resource transmission information including a target identifier of a virtual article sent by the first user and operation information of the first user performed on the first terminal.

In some embodiments, the second terminal may include various intelligent terminals such as a smartphone and a tablet computer. The first user may send the virtual article, for example, a flower, to the second user when a second user performs video interaction with the first user by using a second terminal. For example, the video connection may be established for a live broadcast. The second user and one or more first users may launch live broadcast application installed on their respective terminals and/or logging into user accounts registered with the live broadcast service provider. In a virtual room participated by the second user and the first user, the second user may send real-time video data recorded by the second terminal (e.g., a smart phone or a tablet) to one or more first terminals in stream media format. The live broadcast service provider may be an application server that facilitates video communications and user interactions. The second user may be considered as a host or emcee of the virtual live broadcast room, and the first user may compliment or interact with the host by posting comments, sending gifts, or performing other interactions supported by the live broadcast application and/or server. In some embodiments, the first terminal, as used herein, may refer to the terminal that sends out a gift; and the first user may refer to the user of the first terminal (e.g., audience/visitor in the virtual live broadcast room). Further, the second terminal, as used herein, may refer to the terminal that receives the gift, and the second user may refer to the user of the second terminal (e.g., emcee of the virtual live broadcast room).

In some embodiments, the first user sends the electronic resource transmission information to the second terminal. The electronic resource may be various virtual articles. The electronic resource transmission information includes the target identifier of the virtual article sent by the first user and the operation information of the first user for the first terminal. For example, the first user may send the electronic resource transmission information while the live broadcast is in session (e.g., while the first terminal is currently and continuously receiving and displaying video data streamed by the emcee). Optionally, sending of the virtual article may be applied to a gift giving scenario, that is, a scenario in which the first user gives a gift to the second user.

Figure 4:
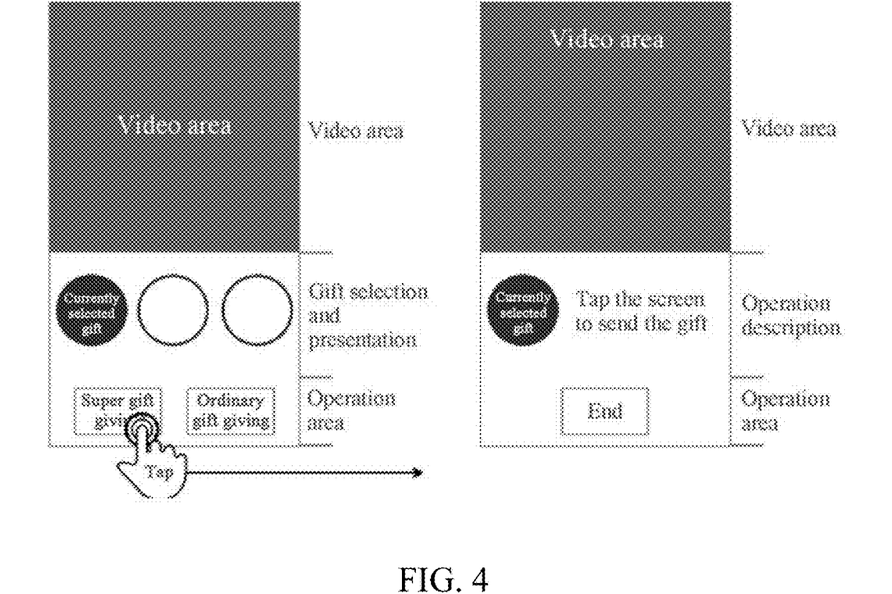
FIG. 4 is a schematic diagram of an operation for giving a gift according to an embodiment of this application.

Specifically, optionally, a display interface of the first terminal is shown in FIG. 4 after the first user selects a type of a virtual article (a gift) that needs to be sent, and selects a quantity of the virtual articles (the gifts). The user taps "super gift giving" or "ordinary gift giving" to enter a state of sending the virtual article. As shown in FIG. 4, a display screen of the first terminal is divided into three areas: a video area (e.g., designated to display ongoing stream video of the emcee and display user interaction effects as a layer added on to the stream video), a virtual article (gift) presentation area, and an operation area. The virtual article presentation area is used for presenting the to-be-sent virtual article selected by the first user. The display screen of the first terminal enters the second display interface in FIG. 4 after the first user taps "super gift giving". The user may send the virtual article by means of a further operation. The operation includes, but is not limited to, tapping, sliding, holding, and shaking. Different operation types may correspond to different display manners.

The first user operates the first terminal after selecting the target virtual article to be sent to the second user, to send the target virtual article. The first terminal encapsulates the target identifier of the target virtual article and the operation information of the user into the electronic resource transmission information, and sends the electronic resource transmission information to the second terminal. The second terminal receives the electronic resource transmission information, and parses the electronic resource transmission information to obtain the target identifier and the operation information. It should be noted that as shown in FIG. 4, the operation performed by the first user on the screen of the first terminal may be an operation performed in the video area of the screen of the first terminal.

Figure 5:
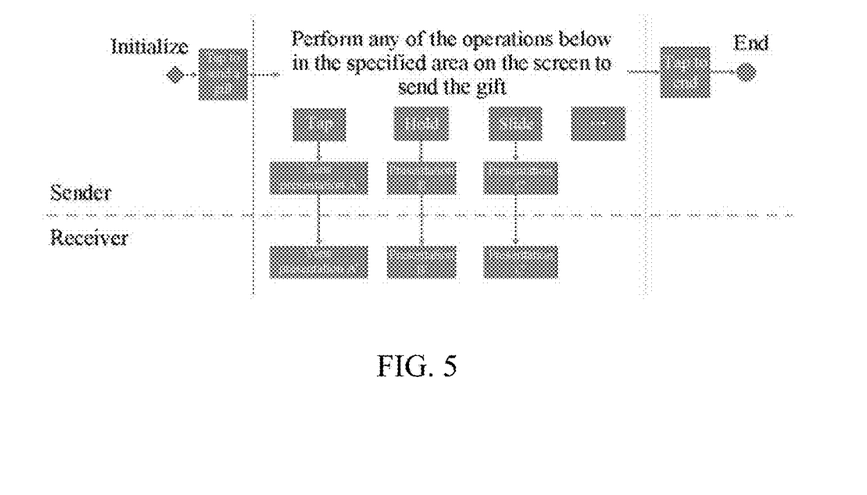
FIG. 5 is a schematic diagram of display control according to an embodiment of this application.

The operation information may include only an operation type to which an operation performed by the first user on the first terminal belongs. The operation type includes any one of shaking, tapping, sliding, or holding, and one operation type corresponds to one display manner of a target virtual article. As shown in FIG. 5, FIG. 5 is a diagram of a display system according to an embodiment of this application. The sender (that is, the first user) performs sending by performing any operation in a specified area of the screen of the first terminal. The operation includes tapping, holding, sliding, and the like. Presentation A corresponding to the tapping operation type, presentation B corresponding to the holding operation type, and presentation C corresponding to the sliding operation type can be seen on a display interface of the sender. Presentation A' corresponding to tapping, presentation B' corresponding to holing, and presentation C' corresponding to sliding can be seen on a display interface of the receiver. In some embodiments, presentation displayed on the first terminal may be substantially the same as presentation displayed on the second terminal. The operation information may further include a first position where the first user performs an operation on the screen of the first terminal. Different operations may generate different first positions. For example, a first position generated by tapping the screen of the terminal is a tapping location, a first position generated by holding the screen of the terminal may be multiple same first positions generated according to a time of holding, and a first position generated by sliding on the screen of the terminal may be multiple positions on a sliding track. When displayed on the second terminal, a target virtual article may be displayed at a second position corresponding to the first position. The operation information may include the operation type of the operation performed by the first user on the first terminal and the first position where the first user performs the operation on the screen of the first terminal. Therefore, when displayed on the second terminal, the target virtual article may be displayed at the second position of the second terminal that corresponds to the first position and in a display manner corresponding to the operation type.

S101: Obtain a target virtual article identified by the target identifier.

In some embodiments, the second terminal obtains the target virtual article identified by the target identifier. It should be noted that each virtual article has a unique identifier (e.g., in the live broadcast application/server). A same type of virtual articles has a same identifier in the first terminal and the second terminal. Therefore, when sending a virtual article, the first user only needs to transmit a target identifier of the sent virtual article to the second terminal, and the second terminal can obtain a corresponding target virtual article by using the target identifier.

S102: Display the target virtual article in a display manner corresponding to the operation information.

In some embodiments, the second terminal parses electronic resource transmission information to obtain the operation information of the first user. The operation information includes at least one of the operation types of the operation performed by the first user on the first terminal or the first position where the first user performs the operation on the screen of the first terminal. The operation type includes, but is not limited to, shaking, tapping, holding, and sliding. A correspondence between different operation information and display manners is preset in the second terminal. For example, each operation type corresponds to a specific display manner. The second terminal sends and presents several target virtual articles at a random position on the screen if the first terminal is shaken. Further, optionally, the second position where the target virtual article is displayed on the second terminal needs to be determined according to the first position if the operation information includes the first position and the operation type. The target virtual article is displayed at the second position in the display manner corresponding to the operation type.

In some embodiments, a video connection is established to a first terminal. Electronic resource transmission information sent by a first user is received. The electronic resource transmission information includes a target identifier of a virtual article sent by the first user and operation information of the first user for a first terminal. A target virtual article identified by the target identifier is obtained. The target virtual article is displayed in a display manner corresponding to the operation information. In this manner, the target virtual article may be displayed in the display manner corresponding to the operation information of the first user. Display manners are diversified, and user experience is improved.

Figure 2:
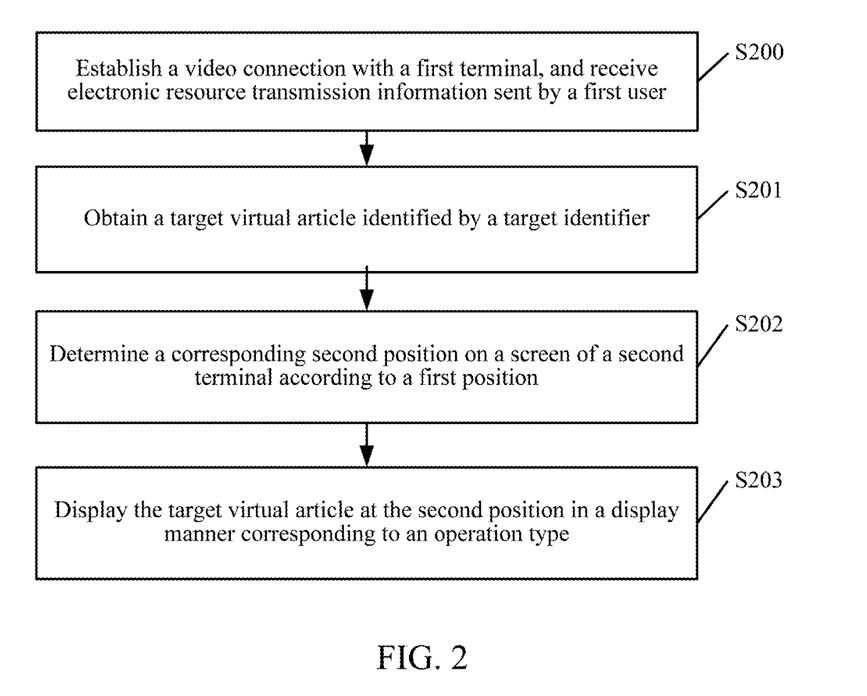
FIG. 2 is a flowchart of another display control method according to an embodiment of this application.

Referring to FIG. 2, FIG. 2 is a flowchart of another display control method according to an embodiment of this application. The method may include step S200 to step S203.

S200: Establish a video connection to a first terminal, and receive electronic resource transmission information sent by a first user, the electronic resource transmission information including a target identifier of a virtual article sent by the first user and operation information of the first user for a first terminal.

S201: Obtain a target virtual article identified by the target identifier.

For steps S200 and S201 in some embodiments, refer to steps S100 and S101 in the embodiment of FIG. 1, and details are not described herein again.

S202: Determine a corresponding second position on a screen of a second terminal according to a first position.

In some embodiments, if the operation information that is received by the second terminal and that is sent by the first terminal includes an operation type of an operation performed by the first user on the first terminal and the first position where the first user performs an operation on a screen of the first terminal, optionally, to adapt to different sizes of screens of the second terminal and the first terminal, the first position may be relative coordinate information of the screen of the first terminal. For example, the screen of the first terminal is divided into 100*100 grid coordinates. When a user performs an operation in a grid whose coordinates are (50, 50), (50, 50) is determined as the first position.

Figure 6:
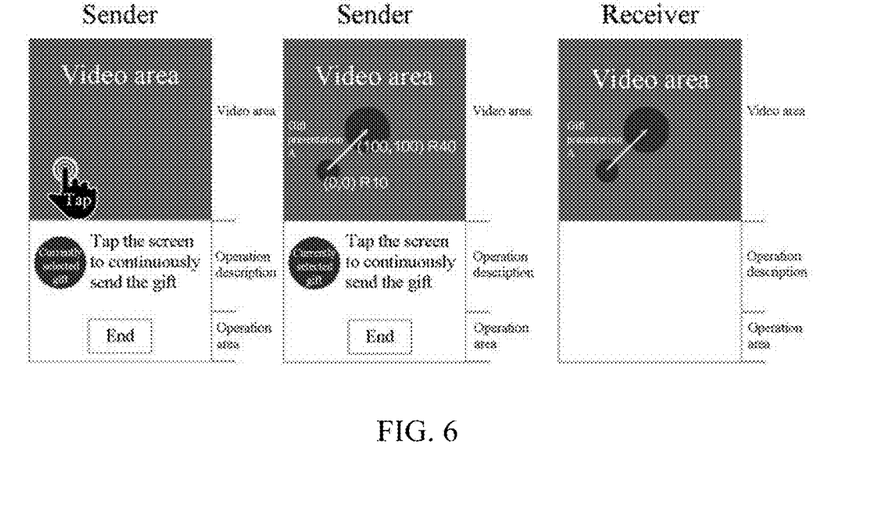
FIG. 6 is a schematic diagram of giving a gift by means of tapping according to an embodiment of this application.
Figure 7:
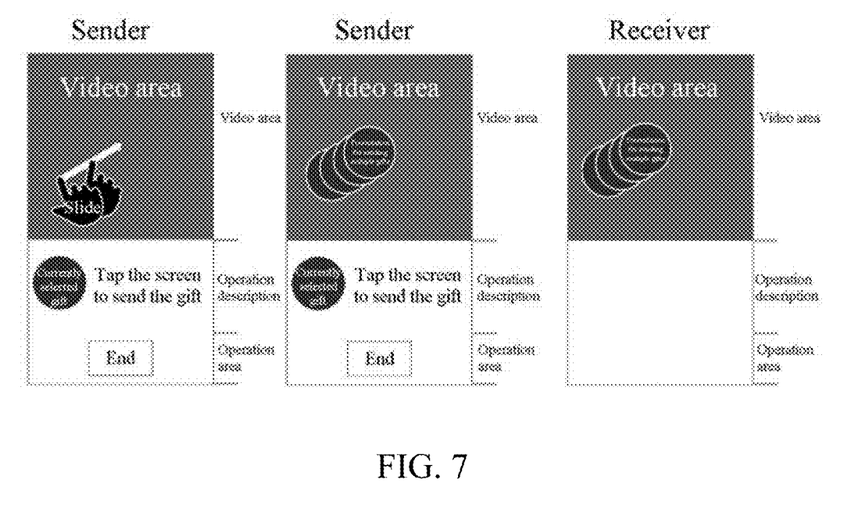
FIG. 7 is a schematic diagram of giving a gift by means of sliding according to an embodiment of this application.

The second terminal determines the second position on the screen of the second terminal according to the first position. It should be noted that to correspond to the first terminal, the manner for dividing the screen of the second terminal into grids is the same as a manner for the first terminal. That is, the screen of the first terminal is also divided into 100*100 grid coordinates. The manner for determining the corresponding second position on the screen of the second terminal according to the first position may be that coordinates of the second position are the same as that of the first position, or coordinates of the first position may be changed to preset values to serve as coordinates of the second position. As shown in FIG. 6 and FIG. 7, the coordinates of the first position and the coordinates of the second position of the first terminal and the second terminal are the same. In some embodiments, when the second terminal and the first terminal has different size or resolution of video display area, coordinates of the second position is calculated to be proportional to the coordinates of the first position, such that the second terminal and the first terminal appears to show similar display effect of the virtual article at relatively the same position. Further, the virtual article may be displayed as an animation effect added on to the live stream video data. In other words, the live stream video data is not interrupted, and the virtual article is presented as an added layer in the video area. In some embodiments, the virtual room may include a second user (e.g., emcee) and multiple audience users. When one user sends a virtual article, the second terminal of the emcee, the terminal of the first user, and terminals of other audience users may all display the animation effect of the virtual article on their respective video area.

S203: Display the target virtual article at the second position in a display manner corresponding to the operation type.

In some embodiments, the target virtual article is displayed at the determined second position in the display manner corresponding to the operation type. Specific display presentation of each virtual article in various operation types may be the same or may be different. However, general display manners of different operation types are different. For example, only one target virtual article needs to be displayed by means of tapping, while multiple target virtual articles need to be displayed on a sliding track by means of sliding or one virtual article is displayed along the sliding track. Descriptions are given below by using examples in which the operation type is tapping, sliding, and holding.

Optionally, if the operation type is tapping the screen, the display manner corresponding to the operation type may be setting the determined second position (x, y) to an initial origin (0, 0) of coordinates. N (n is a fixed value, and may be 1, 5, 10, and the like) gifts are given by means of each tapping, and presentation animation is a particular form A.

The particular form A may not be limited, for example, popping up to a particular position, increasing the size, and then fading out. Further, as shown in FIG. 6, in the screen of the second terminal, the target virtual article moves up to (100, 100), the radius of the prototype size is increased by four times, a moving process is 1 s, and then the target virtual article fades out after 1 s.

Optionally, if the operation type is sliding, the first terminal records position coordinates (X1, Y1), (X2, Y2), (X3, Y3) . . . every a seconds (for example, a=⅓ second), and then separately sends the coordinates to the second terminal. The second terminal determines the second position for display on a screen of the second terminal according to the coordinates, and displays presentation of a particular virtual article at each pair of coordinates (Xn, Yn) at the second position. The presentation of the particular virtual article may be the form A in some embodiments. As shown in FIG. 7, FIG. 7 shows a display manner that is determined according to multiple coordinates on a sliding track. An effect of continuously sending multiple virtual articles according to the sliding track of a user may be simulated in such a manner.

Optionally, if the operation type is holding, the second terminal may repeat a display animation or presentation animation of the virtual article at the determined second position every a seconds (for example, a=⅓ second). In addition, to diversify display manners, no same presentation of virtual articles is repeatedly displayed when the user performs holding (X1, Y1) are completely the same as (X2, Y2), for example, popping up to a random position, randomly increasing the size, and then fading out. Optionally, the virtual article moves up to (X, Y), the radius of the prototype size is increased by n times, a moving process is 1 s, and then the virtual article fades out after 1 s. X and Y are selected from (50-200) by using a random function, and n is selected from (1-4) by using a random function.

It should be noted that the display animation may not be limited to the foregoing display manner, and needs to be determined according to a preset animation form. For example, the size of the target virtual article may be controlled at the second position to increase n times within 1 s, and then is restored to the original size after 1 s. This procedure is repeated for three times. In this way, a "flickering" effect may be implemented.

The display manner may not be limited either. The second terminal may preset that different operation types correspond to different display manners. The second position corresponding to an operation track of a user may be recorded when the operation type is sliding. In this case, the preset display manner is not sending a virtual article at each track point. Instead, only one virtual article is sent after each sliding. The virtual article is made to move according to the track from (0, 0), rotate, and then fade out.

Further, optionally, the displaying the target virtual article at the second position in a display manner corresponding to the operation type includes: displaying the target virtual article at the second position in the display manner corresponding to the operation type a preset quantity of times. For example, the target virtual article may be displayed repeatedly for the preset quantity of times.

In some embodiments, the target virtual article may be displayed at the second position the preset quantity of times when the target virtual article is displayed at the second position in the display manner corresponding to the operation type, so that the display manners of the target virtual article are diversified.

In some embodiments, a video connection is established to a first terminal. Electronic resource transmission information sent by a first user is received. The electronic resource transmission information includes a target identifier of a virtual article sent by the first user and operation information of the first user for a first terminal. A target virtual article identified by the target identifier is obtained. The target virtual article is displayed in a display manner corresponding to the operation information. In this manner, the target virtual article may be displayed in the display manner corresponding to the operation information of the first user. Display manners are diversified, and user experience is improved.

Figure 3:
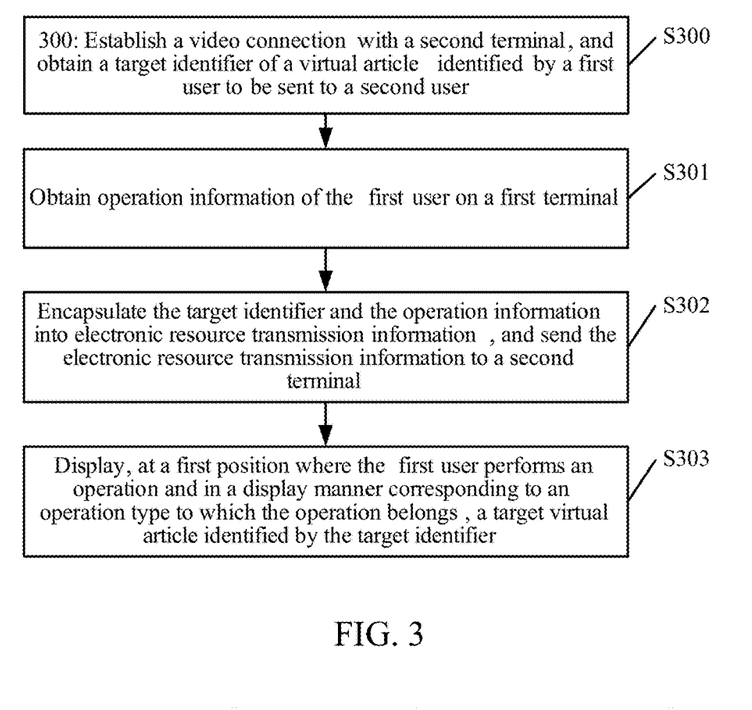
FIG. 3 is a flowchart of still another display control method according to an embodiment of this application.

Referring to FIG. 3, FIG. 3 is a flowchart of another display control method according to an embodiment of this application. The method may be applied to a first terminal and include step S300 to step S303.

S300: Establish a video connection with a second terminal, and obtain a target identifier of a virtual article identified by a first user to be sent to a second user.

In some embodiments, when performing video interaction with the second user, the first user may send the virtual article to the second user by operating the first terminal. Specifically, optionally, the first user may give a gift to the second user by operating the first terminal.

As shown in FIG. 4, FIG. 4 is a schematic diagram of a display interface of a first terminal according to an embodiment of this application. As shown in the figure, the first user may select, in a virtual article (gift) presentation area, a virtual article (a gift) that needs to be sent to the second user, and obtains a target identifier of the selected virtual article. The first user may perform super gift giving or ordinary gift after selecting the virtual article.

S301: Obtain operation information of an operation of the first user performed on the first terminal associated with the identified virtual article.

In some embodiments, as shown in the second display interface in FIG. 4, after selecting the to-be-sent virtual article and clicking "super gift giving", the first user needs to further operate a screen of the first terminal to send the virtual article. It should be noted that the first user may perform an operation in a video area of the display screen of the first terminal. The operation includes, but is not limited to, tapping, sliding, and holding. Further, optionally, the first user may send the virtual article by shaking the first terminal.

The operation information may include an operation type to which the operation performed by the user on the first terminal belongs and a first position of the operation. The first position of the operation may be a position of an operation performed by the first user on the screen of the first terminal.

S302: Encapsulate the target identifier and the operation information into electronic resource transmission information, and send the electronic resource transmission information to a second terminal to trigger the second terminal to display, in a display manner corresponding to the operation information, a target virtual article identified by the target identifier.

In some embodiments, the target identifier and the operation information that are obtained are encapsulated into the electronic resource transmission information, and the electronic resource transmission information is sent to the second terminal. The second terminal may parse the electronic resource transmission information after receiving the electronic resource transmission information, to obtain the target identifier and the operation information in the electronic resource transmission information, so as to display the target virtual article identified by the target identifier in the display manner corresponding to the operation information.

Further, optionally, if an operation performed by the first user on the first terminal is an operation performed by the first user on a screen of the first terminal, the display control method further includes the following steps:

S303: Display, at a first position where the first user performs an operation and in a display manner corresponding to an operation type to which the operation belongs, the target virtual article identified by the target identifier.

In some embodiments, to enable the first user to see an effect of sending the virtual article, the target virtual article is displayed at the first position where the first user performs the operation and in the display manner corresponding to the operation type to which the operation belongs. As shown in FIG. 6, display is performed at the first position where the first user performs tapping and in a particular display manner. As shown in FIG. 7, display is performed at multiple positions of a sliding track of the first user in a particular display manner.

In some embodiments, a video connection is established to a first terminal. Electronic resource transmission information sent by a first user is received. The electronic resource transmission information includes a target identifier of a virtual article sent by the first user and operation information of the first user for a first terminal. A target virtual article identified by the target identifier is obtained. The target virtual article is displayed in a display manner corresponding to the operation information. In this manner, the target virtual article may be displayed in the display manner corresponding to the operation information of the first user. Display manners are diversified, and user experience is improved.

A display control apparatus provided in an embodiment of this application is described in detail below with reference to FIG. 8 to FIG. 10.

Figure 8:
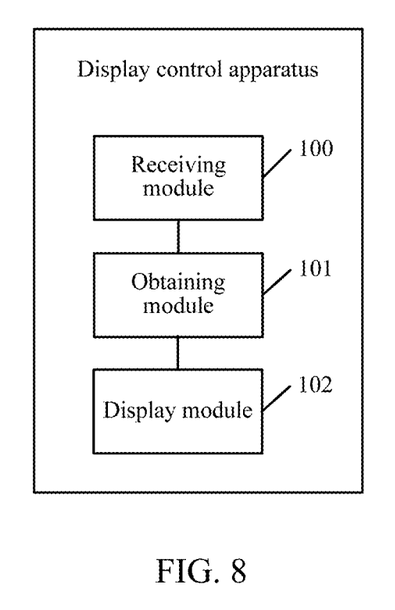
FIG. 8 is a schematic structural diagram of a display control apparatus applied to a second terminal according to an embodiment of this application.

Referring to FIG. 8, FIG. 8 is a schematic structural diagram of a display control apparatus applied to a second terminal according to an embodiment of this application. The apparatus may include: a receiving module 100, an obtaining module 101, and a display module 102. These program modules may be stored in a memory of the second terminal and executed by a processor of the second terminal.

The receiving module 100 is configured to: establish a video connection to a first terminal, and receive electronic resource transmission information sent by a first user, the electronic resource transmission information including a target identifier of a virtual article sent by the first user and operation information of the first user for a first terminal.

In some embodiments, the second terminal may include various intelligent terminals such as a smartphone and a tablet computer. The first user may send the virtual article, for example, a flower, to the second user when a second user performs video interaction with the first user by using a second terminal.

In some embodiments, the first user sends the electronic resource transmission information to the second terminal. The electronic resource may be various virtual articles. The electronic resource transmission information includes the target identifier of the virtual article sent by the first user and the operation information of the first user for the first terminal. Optionally, sending of the virtual article may be applied to a gift giving scenario, that is, a scenario in which the first user gives a gift to the second user.

Specifically, optionally, a display interface of the first terminal is shown in FIG. 4 after the first user selects a type of a virtual article (a gift) that needs to be sent, and selects a quantity of the virtual articles (the gifts). The user taps "super gift giving" or "ordinary gift giving" to enter a state of sending the virtual article. As shown in FIG. 4, a display screen of the first terminal is divided into three areas: a video area, a virtual article (gift) presentation area, and an operation area. The virtual article presentation area is used for presenting the to-be-sent virtual article selected by the first user. The display screen of the first terminal enters the second display interface in FIG. 4 after the first user taps "super gift giving". The user may send the virtual article by means of a further operation. The operation includes, but is not limited to, tapping, sliding, holding, and shaking. Different operation types may correspond to different display manners.

The first user operates the first terminal after selecting the target virtual article to be sent to the second user, to send the target virtual article. The first terminal encapsulates the target identifier of the target virtual article and the operation information of the user into the electronic resource transmission information, and sends the electronic resource transmission information to the second terminal. The second terminal receives the electronic resource transmission information, and parses the electronic resource transmission information to obtain the target identifier and the operation information. It should be noted that as shown in FIG. 4, the operation performed by the first user on the screen of the first terminal may be an operation performed in the video area of the screen of the first terminal.

The operation information may include only an operation type to which an operation performed by the first user on the first terminal belongs. The operation type includes any one of shaking, tapping, sliding, or holding, and one operation type corresponds to one display manner of a target virtual article. As shown in FIG. 5, FIG. 5 is a diagram of a display system according to an embodiment of this application. The sender (that is, the first user) performs sending by performing any operation in a specified area of the screen of the first terminal. The operation includes tapping, holding, sliding, and the like. Presentation A corresponding to the tapping operation type, presentation B corresponding to the holding operation type, and presentation C corresponding to the sliding operation type can be seen on a display interface of the sender. Presentation A' corresponding to tapping, presentation B' corresponding to holing, and presentation C' corresponding to sliding can be seen on a display interface of the receiver. The operation information may further include a first position where the first user performs an operation on the screen of the first terminal. Different operations may generate different first positions. For example, a first position generated by tapping the screen of the terminal is a tapping location, a first position generated by holding the screen of the terminal may be multiple same first positions generated according to a time of holding, and a first position generated by sliding on the screen of the terminal may be multiple positions on a sliding track. When displayed on the second terminal, a target virtual article may be displayed at a second position corresponding to the first position. The operation information may include the operation type of the operation performed by the first user on the first terminal and the first position where the first user performs the operation on the screen of the first terminal. Therefore, when displayed on the second terminal, the target virtual article may be displayed at the second position of the second terminal that corresponds to the first position and in a display manner corresponding to the operation type.

The obtaining module 101 is configured to obtain a target virtual article identified by the target identifier.

In some embodiments, the obtaining module 101 of the second terminal obtains the target virtual article identified by the target identifier. It should be noted that each virtual article has a unique identifier. A same type of virtual articles has a same identifier in the first terminal and the second terminal. Therefore, when sending a virtual article, the first user only needs to transmit a target identifier of the sent virtual article to the second terminal, and the second terminal can obtain a corresponding target virtual article by using the target identifier.

The display module 102 is configured to display the target virtual article in a display manner corresponding to the operation information.

In some embodiments, the second terminal parses electronic resource transmission information to obtain the operation information of the first user. The operation information includes at least one of the operation type to which the operation performed by the first user on the first terminal belongs or the first position where the first user performs the operation on the screen of the first terminal. The operation type includes, but is not limited to, shaking, tapping, holding, and sliding. A correspondence between different operation information and display manners is preset in the second terminal. For example, one operation type corresponds to one display manner. The display module 102 of the second terminal sends and presents several target virtual articles at a random position on the screen if the first terminal is shaken. Further, optionally, the display module 102 needs to determine, according to the first position if the operation information includes the first position and the operation type, the second position where the target virtual article is displayed on the second terminal. The target virtual article is displayed at the second position in the display manner corresponding to the operation type.

Figure 9:
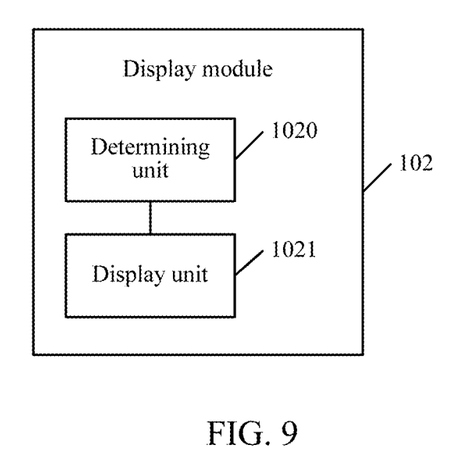
FIG. 9 is a schematic structural diagram of a display module according to an embodiment of this application.

Further, optionally, as shown in FIG. 9, the display module 102 may include a determining unit 1020 and a display unit 1021.

The determining unit 1020 is configured to determine a corresponding second position on a screen of a second terminal according to the first position.

In some embodiments, if the operation information that is received by the second terminal and that is sent by the first terminal includes an operation type of an operation performed by the first user on the first terminal and the first position where the first user performs an operation on a screen of the first terminal, optionally, to adapt to different sizes of screens of the second terminal and the first terminal, the first position may be relative coordinate information of the screen of the first terminal. For example, the screen of the first terminal is divided into 100*100 grid coordinates. When a user performs an operation in a grid whose coordinates are (50, 50), (50, 50) is determined as the first position.

The determining unit 1020 of the second terminal determines the second position on the screen of the second terminal according to the first position. It should be noted that to correspond to the first terminal, the manner for dividing the screen of the second terminal into grids is the same as a manner for the first terminal. That is, the screen of the first terminal is also divided into 100*100 grid coordinates. The manner for determining the corresponding second position on the screen of the second terminal according to the first position may be that coordinates of the second position are the same as that of the first position, or coordinates of the first position may be changed to preset values to serve as coordinates of the second position.

The display unit 1021 is configured to display the target virtual article at the second position in a display manner corresponding to the operation type.

In some embodiments, the display unit 1021 displays the target virtual article at the determined second position in the display manner corresponding to the operation type. Specific display animations of each virtual article in various operation types may be the same or may be different. However, general display manners of different operation types are different. For example, only one target virtual article needs to be displayed by means of tapping, while multiple target virtual articles need to be displayed on a sliding track by means of sliding or one virtual article is displayed along the sliding track. Descriptions are given below by using examples in which the operation type is tapping, sliding, and holding.

Optionally, if the operation type is tapping the screen, the display manner corresponding to the operation type may be setting the determined second position (x, y) to an initial origin (0, 0) of coordinates. N (n is a fixed value, and may be 1, 5, 10, and the like) gifts are given by means of each tapping, and a presentation animation is a particular form A.

The particular form A may not be limited, for example, popping up to a particular position, increasing the size, and then fading out. Further, as shown in FIG. 6, in the screen of the second terminal, the target virtual article moves up to (100, 100), the radius of the prototype size is increased by four times, a moving process is 1 s, and then the target virtual article fades out after 1 s.

Optionally, if the operation type is sliding, the first terminal records position coordinates (X1, Y1), (X2, Y2), (X3, Y3) . . . every a seconds (for example, a=⅓ second), and then separately sends the coordinates to the second terminal. The second terminal determines the second position for display on a screen of the second terminal according to the coordinates, and displays presentation of a particular virtual article at each pair of coordinates (Xn, Yn) at the second position. The presentation of the particular virtual article may be the form A in some embodiments. As shown in FIG. 7, FIG. 7 shows a display manner that is determined according to multiple coordinates on a sliding track. An effect of continuously sending multiple virtual articles according to the sliding track of a user may be simulated in such a manner.

Optionally, if the operation type is holding, the second terminal may repeat a display animation of the virtual article at the determined second position every a seconds (for example, a=⅓ second). In addition, to diversify display manners, no same presentation of virtual articles is repeatedly displayed when the user performs holding (X1, Y1) are completely the same as (X2, Y2), for example, popping up to a random position, randomly increasing the size, and then fading out. Optionally, the virtual article moves up to (X, Y), the radius of the prototype size is increased by n times, a moving process is 1 s, and then the virtual article fades out after 1 s. X and Y are selected from (50-200) by using a random function, and n is selected from (1-4) by using a random function.

It should be noted that the display animation may not be limited to the foregoing display manner, and needs to be determined according to a preset animation form. For example, the size of the target virtual article may be controlled at the second position to increase n times within 1 s, and then is restored to the original size after 1 s. This procedure is repeated for three times. In this way, a "flickering" effect may be implemented.

The display manner may not be limited either. The second terminal may preset that different operation types correspond to different display manners. The second position corresponding to an operation track of a user may be recorded when the operation type is sliding. In this case, the preset display manner is not sending a virtual article at each track point. Instead, only one virtual article is sent after each sliding. The virtual article is made to move according to the track from (0, 0), rotate, and then fade out.

Optionally, the display unit 1021 is specifically configured to display the target virtual article at the second position in the display manner corresponding to the operation type a preset quantity of times.

In some embodiments, the display unit 1021 may display the target virtual article at the second position the preset quantity of times when displaying the target virtual article at the second position in the display manner corresponding to the operation type, so that the display manners of the target virtual article are diversified.

In some embodiments, a video connection is established to a first terminal. Electronic resource transmission information sent by a first user is received. The electronic resource transmission information includes a target identifier of a virtual article sent by the first user and operation information of the first user for a first terminal. A target virtual article identified by the target identifier is obtained. The target virtual article is displayed in a display manner corresponding to the operation information. In this manner, the target virtual article may be displayed in the display manner corresponding to the operation information of the first user. Display manners are diversified, and user experience is improved.

According to an embodiment of this application, the display control method shown in FIG. 1 and FIG. 2 may be a human device interaction method executed by the units in the display control apparatus shown in FIG. 8 and FIG. 9. For example, step S100, step S101, and step S102 that are shown in FIG. 1 may be respectively performed by the receiving module 100, the obtaining module 101, and the display module 102 that are shown in FIG. 8; and step S200, step S201, step S202, and step S203 that are shown in FIG. 9 may be respectively executed by the receiving module 100, the obtaining module 101, the determining unit 1020, and the display unit 2021 that are shown in FIG. 1 and FIG. 2.

According to another embodiment of this application, a part or all of the units of the display control apparatus shown in FIG. 8 and FIG. 9 may be combined into one or several other units, or one (or more) of the units may be divided into multiple units of smaller functions. In this way, same operations can be implemented without affecting implementation of the technical effects of the embodiments of this application. The foregoing units are divided based on logical functions. In actual application, a function of one unit may be implemented by multiple units, or functions of multiple units are implemented by one unit. In another embodiment of this application, the terminal device may include another module. However, in actual application, these functions may be cooperatively implemented by another unit and may be cooperatively implemented by multiple units.

According to another embodiment of this application, a computer program (including program code) that can execute the display control method shown in FIG. 1 and FIG. 2 may run on a general computing device of a computer including processing elements and storage elements such as a central processing unit (CPU), a random access memory (RAM), and a read-only memory (ROM), to construct the display control apparatus shown in FIG. 8 and FIG. 9, and implement the display control method according to the embodiments of this application. The computer program may be recorded in, for example, a computer readable recording medium, and may be loaded into the foregoing computing device by using the computer readable recording medium, and run in the computing device.

Figure 10:
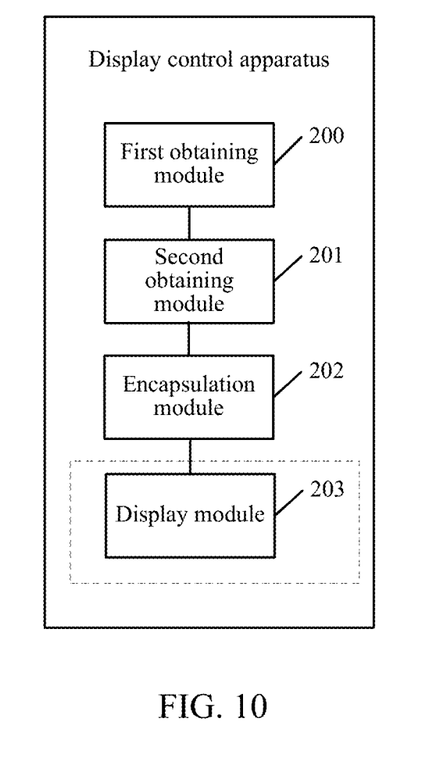
FIG. 10 is a schematic structural diagram of a display control apparatus applied to a first terminal according to an embodiment of this application.

Referring to FIG. 10, FIG. 10 is a schematic structural diagram of a display control apparatus applied to a first terminal according to an embodiment of this application. The apparatus may include: a first obtaining module 200, a second obtaining module 201, an encapsulation module 202, and a display module 203. These program modules may be stored in a memory of the first terminal and executed by a processor of the first terminal.

The first obtaining module 200 is configured to: establish a video connection to a second terminal, and obtain a target identifier of a virtual article that is sent by a first user to a second user.

In some embodiments, when performing video interaction with the second user, the first user may send the virtual article to the second user by operating the first terminal. Specifically, optionally, the first user may give a gift to the second user by operating the first terminal.

As shown in FIG. 4, FIG. 4 is a schematic diagram of a display interface of a first terminal according to an embodiment of this application. As shown in the figure, the first user may select, in a virtual article (gift) presentation area, a virtual article (a gift) that needs to be sent to the second user, and the first obtaining module 200 obtains a target identifier of the selected virtual article. The first user may perform super gift giving or ordinary gift after selecting the virtual article.

The second obtaining module 201 is configured to obtain operation information of the first user for a first terminal.

In some embodiments, as shown in the second display interface in FIG. 4, after selecting the to-be-sent virtual article and clicking "super gift giving", the first user needs to further operate a screen of the first terminal to send the virtual article. It should be noted that the first user may perform an operation in a video area of the display screen of the first terminal. The operation includes, but is not limited to, tapping, sliding, and holding. Further, optionally, the first user may send the virtual article by shaking the first terminal.

The operation information may include an operation type to which the operation performed by the user on the first terminal belongs and a first position of the operation. The first position of the operation may be a position of an operation performed by the first user on the screen of the first terminal.

The encapsulation module 202 is configured to: encapsulate the target identifier and the operation information into electronic resource transmission information, and send the electronic resource transmission information to a second terminal to trigger the second terminal to display, in a display manner corresponding to the operation information, a target virtual article identified by the target identifier.

In some embodiments, the encapsulation module 202 encapsulates the target identifier and the operation information that is obtained into the electronic resource transmission information, and sends the electronic resource transmission information to the second terminal. The second terminal may parse the electronic resource transmission information after receiving the electronic resource transmission information, to obtain the target identifier and the operation information in the electronic resource transmission information, so as to display the target virtual article identified by the target identifier in the display manner corresponding to the operation information.

Further, optionally, if an operation performed by the first user on the first terminal is an operation performed by the first user on a screen of the first terminal, the terminal further includes: a display module 203, configured to display, at a first position where the first user performs the operation and in a display manner corresponding to an operation type to which the operation belongs, the target virtual article identified by the target identifier.

In some embodiments, to enable the first user to see an effect of sending the virtual article, the display module 203 displays the target virtual article at the first position where the first user performs the operation and in the display manner corresponding to the operation type to which the operation belongs. As shown in FIG. 6, display is performed at the first position where the first user performs tapping and in a particular display manner. As shown in FIG. 7, display is performed at multiple positions of a sliding track of the first user in a particular display manner.

According to an embodiment of this application, the display control method shown in FIG. 3 may be a human device interaction method executed by the units in the display control apparatus shown in FIG. 10. For example, step S300 shown in FIG. 3 may be performed by the first obtaining module 200 shown in FIG. 10; step S301 shown in FIG. 3 may be performed by the second obtaining module 201 shown in FIG. 10; step S302 shown in FIG. 3 may be performed by the encapsulation module 203 shown in FIG. 10; and step S303 shown in FIG. 3 may be performed by the display module 203 shown in FIG. 10.

According to another embodiment of this application, a part or all of the units of the display control apparatus shown in FIG. 10 may be combined into one or several other units, or one (or more) of the units may be divided into multiple units of smaller functions. In this way, same operations can be implemented without affecting implementation of the technical effects of the embodiments of this application. The foregoing units are divided based on logical functions. In actual application, a function of one unit may be implemented by multiple units, or functions of multiple units are implemented by one unit. In another embodiment of this application, the terminal device may include another module. However, in actual application, these functions may be cooperatively implemented by another unit and may be cooperatively implemented by multiple units.

According to another embodiment of this application, a computer program (including program code) that can execute the display control method shown in FIG. 3 may run on a general computing device of a computer including processing elements and storage elements such as a central processing unit (CPU), a random access memory (RAM), and a read-only memory (ROM), to construct the display control apparatus shown in FIG. 10, and implement the display control method according to the embodiments of this application. The computer program may be recorded in, for example, a computer readable recording medium, and may be loaded into the foregoing computing device by using the computer readable recording medium, and run in the computing device.

In some embodiments, a video connection is established to a first terminal. Electronic resource transmission information sent by a first user is received. The electronic resource transmission information includes a target identifier of a virtual article sent by the first user and operation information of the first user for a first terminal. A target virtual article identified by the target identifier is obtained. The target virtual article is displayed in a display manner corresponding to the operation information. In this manner, the target virtual article may be displayed in the display manner corresponding to the operation information of the first user. Display manners are diversified, and user experience is improved.

Figure 11:
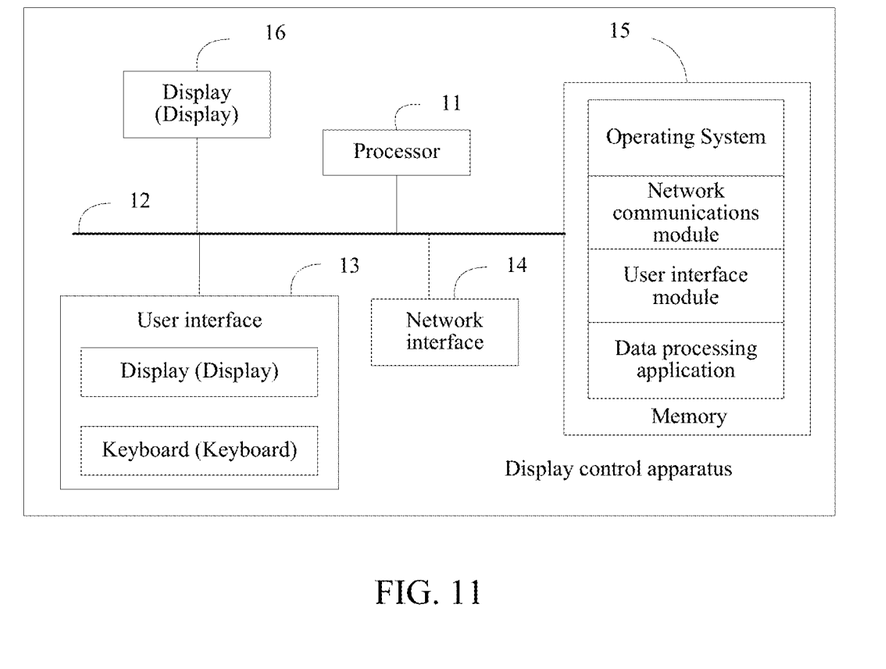
FIG. 11 is a schematic structural diagram of another display control apparatus according to an embodiment of this application.

Referring to FIG. 11, FIG. 11 is a schematic structural diagram of another display control apparatus according to an embodiment of this application. As shown in FIG. 11, the display control apparatus includes: at least one processor 11, for example, a CPU, at least one network interface 14, a user interface 13, a memory 15, and at least one communications bus 12. The communications bus 12 is configured to implement connection communication between the components. The user interface 13 may include a display and a keyboard. Optionally, the user interface 13 may further include a standard wired interface and wireless interface. The network interface 14 may optionally include a standard wired interface and wireless interface (for example, a WiFi interface or a Bluetooth interface). The memory 15 may be a high-speed RAM memory, or a non-volatile memory, for example, at least one magnetic disk storage. The memory 15 may optionally be at least one storage apparatus located far away from the processor 101. As shown in FIG. 11, as a computer storage medium, the memory 15 may include: an operating system, a network communications module, a user interface module, and a data processing APP.

In the display control apparatus as shown in FIG. 11, when the foregoing apparatus is a second terminal, the network interface 14 is mainly configured to connect to a first terminal, and performs data communication with the first terminal. The second terminal may include various intelligent terminals, for example, a smartphone and a tablet computer. The first user may send a virtual article, for example, a flower, to the second user when a second user performs video interaction with a first user by using a second terminal.

The processor 11 may be configured to: invoke the data processing APP or program code stored in the memory 15, and perform the following operations: establishing a video connection to a first terminal, and receiving electronic resource transmission information sent by a first user, the electronic resource transmission information including a target identifier of a virtual article sent by the first user and operation information of the first user for a first terminal; obtaining a target virtual article identified by the target identifier; and displaying the target virtual article in a display manner corresponding to the operation information.

Preferably, the operation information may only include an operation type to which an operation performed by the first user on the first terminal belongs. The operation type includes any one of shaking, tapping, sliding, or holding, and one operation type corresponds to one display manner of a target virtual article.

Preferably, the operation information may further include a first position where the first user performs an operation on a screen of the first terminal. Different operations may generate different first positions.

Preferably, the operation information may include the operation type to which the operation performed by the first user on the first terminal belongs and the first position where the first user performs an operation on the screen of the first terminal. When displayed on the second terminal, the target virtual article may be displayed at a second position on the second terminal that corresponds to the first position and in a display manner corresponding to the operation type.

In addition, the processor 11 may further be configured to: invoke the data processing APP or program code stored in the memory 15, and perform the following operations: establishing a video connection to a first terminal, and receiving electronic resource transmission information sent by a first user, the electronic resource transmission information including a target identifier of a virtual article sent by the first user and operation information of the first user for a first terminal; obtaining a target virtual article identified by the target identifier; and determining a corresponding second position on a screen of a second terminal according to the first position; and displaying the target virtual article at the second position in a display manner corresponding to the operation type.

In addition, in the display control apparatus shown in FIG. 11, when the foregoing apparatus is a first terminal, the network interface 14 is mainly configured to: connect to second terminal, and perform data communication with the second terminal.

The processor 11 may be configured to: invoke the data processing APP or program code stored in the memory 15, and perform the following operations: establishing a video connection to a second terminal, and obtaining a target identifier of a virtual article that is sent by a first user to a second user; obtaining operation information of the first user for a first terminal; encapsulating the target identifier and the operation information into electronic resource transmission information, and sending the electronic resource transmission information to a second terminal to trigger the second terminal to display, in a display manner corresponding to the operation information, a target virtual article identified by the target identifier; and displaying, at a first position where the first user performs the operation and in a display manner corresponding to an operation type to which the operation belongs, the target virtual article identified by the target identifier.

A person of ordinary skill in the art may understand that all or some of the processes of the methods in the embodiments may be implemented by a computer program by instructing relevant hardware. The program may be stored in a computer readable storage medium. Programs corresponding to the modules of the display control apparatus shown in FIG. 8 to FIG. 10 may be stored in a readable medium of the display control apparatus, and are executed by at least one processor in the display control apparatus, to implement the foregoing display control method. The method includes the procedures described in the method embodiments in FIG. 1 to FIG. 3. The foregoing storage medium may include: a magnetic disk, an optical disc, a read-only memory (ROM), or a random access memory (RAM).

Logic and/or steps described in the flowcharts or herein may be, for example, considered as a sequencing table used for implementing executable instructions of logical functions, and may be specifically implemented in any computer readable medium, to be used by an instruction execution system, apparatus, or device (for example, a system based on a computer, a system including a processor, or another system that can obtain instructions from an instruction execution system, apparatus, or device), or used by combining the instruction execution system, apparatus, or device. In terms of this specification, the "computer readable medium" may be any apparatus that may include, store, communicate with, transfer, or transmit programs to be used by the instruction execution system, apparatus, or device or used by combining the instruction execution system, apparatus, or device. More specific examples (a non-exhaustive list) of the computer readable medium include the following: an electronic connection portion (an electronic apparatus) having one or more cable layouts, a portable computer diskette (a magnetic apparatus), a random access memory, a read-only memory, an erasable programmable read-only memory (EPROM or a flash), a fiber apparatus, and a portable compact disc read-only memory (CDROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then the program is stored in a computer memory.

It should be understood that the parts of this application may be implemented by using hardware, software, firmware, or a combination thereof. In the foregoing implementation, multiple steps or methods may be implemented by using software or firmware that is stored in the memory and that is suitable to be executed by a proper instruction execution system. For example, if the hardware is used for implementation, the same as another implementation, any one of the following known technologies in the art or a combination thereof may be used for implementation: a discreet logic circuit of a logic gate circuit used for implementing a logical function for a data signal, an application-specific integrated circuit having a proper composite logic gate circuit, a programmable gate array (PGA), a field programmable gate array (FPGA), and the like.

The storage medium mentioned above may be a read-only memory, a magnetic disk or, an optical disc. Although the embodiments of this application are already shown and described above, it may be understood that the foregoing embodiments are exemplary, and should not be understood as limitations to this application. A person of ordinary skill in the art may change, modify, replace, and transform the foregoing embodiments within the scope of this application.

What is claimed is:

1. A display control method, comprising:
    establishing, by a first terminal, a video connection with a second terminal, wherein the first terminal comprises a touch screen displaying a graphical interface that includes a video area, a virtual-article display area, and an operation area;
    obtaining, by the first terminal, a target identifier of a virtual article to be sent to the second terminal, the virtual article being identified by a sender interacting with the virtual-article display area on the touch screen of the first terminal;

obtaining, by the first terminal, a virtual-article sending option identified by the sender interacting with the operation area on the touch screen of the first terminal;

obtaining, by the first terminal, operation information of an operation of the sender performed on the touch screen of the first terminal associated with the virtual article, wherein the operation information comprises an operation type, the operation type comprising at least one of tapping, sliding, or holding;

encapsulating, by the first terminal, the target identifier and the operation information into electronic resource transmission information; and sending, by the first terminal, the electronic resource transmission information to the second terminal to trigger the second terminal to display, in a display manner corresponding to the operation information, the virtual article identified by the target identifier on a display-screen interface on the second terminal.

2. The display control method according to claim 1, wherein the operation of the sender is performed on the touch screen of the first terminal at a first position, and the operation information further comprises the first position.

3. The display control method according to claim 2, further comprising:

displaying, by the first terminal at the first position on the touch screen, in the display manner corresponding to the operation type, the virtual article identified by the target identifier.

4. The display control method according to claim 3, wherein the displaying the virtual article at the first position comprises:

displaying the virtual article repeatedly for a number of times at the first position in the display manner corresponding to the operation type.

5. The display control method according to claim 3, further comprising:

according to the first position, determining a second position on the display-screen interface of the second terminal; and displaying the virtual article identified by the target identifier at the second position in the display manner corresponding to the operation type.

6. The display control method according to claim 5, wherein, the operation type is tapping the touch screen of the first terminal at the first position, and the display control method further comprises:

when detecting each tapping on the touch screen of the first terminal, displaying the virtual article at the second position on the display-screen interface of the second terminal in an animation for a predetermined number of times, the animation comprising at least one of: popping up to a predefined position or increasing in size.

7. The display control method according to claim 6, wherein the animation further comprises a fading out effect after the virtual article is popped up to the predefined position or increased in size.

8. The display control method according to claim 6, wherein the animation further comprises a fading out effect after the virtual article is popped up to the random position or increased to the random size.

9. The display control method according to claim 5, wherein, the operation type is touching and sliding on the touch screen of the first terminal along a sliding track starting at the first position, and the display control method further comprises:

recording a first set of positions along the sliding track;
sending the first set of positions to the second terminal;
determining a second set of positions on the display-screen interface of the second terminal according to the first set of point positions; and displaying the virtual article at each of the second set of positions on the display-screen interface of the second terminal.

10. The display control method according to claim 5, wherein, the operation type is touching and holding on the touch screen of the first terminal at the first position for a length of time, and the display control method further comprises:

displaying the virtual article at the second position on the display-screen interface of the second terminal in an animation repeatedly in a predetermined frequency for the length of time, the animation comprising at least one of: popping up to a random position or increasing to a random size.

11. A display control apparatus, applied to a first terminal, comprising:

a touch screen configured to display a graphical interface comprising a video area, a virtual-article display area, and an operation area;

a memory; and a processor coupled to the memory, the processor of the first terminal being configured for:

establishing a video connection with a second terminal;

obtaining a target identifier of a virtual article to be sent to the second terminal, the virtual article being identified by a sender interacting with the virtual-article display area on the touch screen of the first terminal;

obtaining a virtual-article sending option identified by the sender interacting with the operation area on the touch screen of the first terminal;

obtaining operation information of an operation of the sender performed on the touch screen of the first terminal associated with the virtual article, wherein the operation information comprises an operation type, the operation type comprising at least one of tapping, sliding, or holding;

encapsulating the target identifier and the operation information into electronic resource transmission information; and sending the electronic resource transmission information to the second terminal to trigger the second terminal to display, in a display manner corresponding to the operation information, the virtual article identified by the target identifier on a display-screen interface on the second terminal.

12. The display control apparatus according to claim 11, wherein the operation of the sender is performed on the touch screen of the first terminal at a first position, and the operation information further comprises the first position.

13. The display control apparatus according to claim 12, wherein the processor is further configured for displaying, at the first position on the touch screen, in the display manner corresponding to the operation type, the virtual article identified by the target identifier on the screen of the first terminal.

14. The display control apparatus according to claim 13, wherein the processor is further configured for:

displaying the virtual article repeatedly for a number of times at the first position in the display manner corresponding to the operation type.

15. A non-transitory computer-readable medium containing computer-executable program for implementing a display control method, when being executed by a processor, the method comprising:
    establishing, by a first terminal, a video connection with a second terminal, wherein the first terminal has a touch screen configured to display a graphical interface comprising a video area, a virtual-article display area, and an operation area;
    obtaining, by the first terminal, a target identifier of a virtual article to be sent to the second terminal, the virtual article being identified by a sender interacting with the virtual-article display area on the touch screen of the first terminal;
    obtaining, by the first terminal, a virtual-article sending option identified by the sender interacting with the operation area on the touch screen of the first terminal;
    obtaining, by the first terminal, operation information of an operation of the sender performed on the touch screen of the first terminal associated with the virtual article, wherein the operation information comprises an operation type, the operation type comprising at least one of tapping, sliding, or holding;
    encapsulating, by the first terminal, the target identifier and the operation information into electronic resource transmission information; and
    sending, by the first terminal, the electronic resource transmission information to the second terminal to trigger the second terminal to display, in a display manner corresponding to the operation information, the virtual article identified by the target identifier on a display-screen interface on the second terminal.

16. The non-transitory computer-readable medium according to claim 15, wherein the operation performed by the sender is performed on the touch screen of the first terminal at a first position, and the operation information further comprises the first position.

17. The non-transitory computer-readable medium according to claim 16, wherein the method further comprises:
    displaying, by the first terminal at the first position on the touch screen where the sender performs the operation and in the display manner corresponding to the operation type, the virtual article identified by the target identifier.

18. The non-transitory computer-readable medium according to claim 17, wherein the displaying the virtual article at the first position comprises:
    displaying the virtual article repeatedly for a number of times at the first position in the display manner corresponding to the operation type.

* * * * *